(12) United States Patent
Timson (10) Patent No.: US 11,794,622 B2
(45) Date of Patent: Oct. 24, 2023

(54) VEHICLE TAIL LIFT PROTECTION APPARATUS

(71) Applicant: Andrew Timson, Sheffield South (GB)

(72) Inventor: Andrew Timson, Sheffield South (GB)

( * ) Notice: Subject to any disclaimer, the term of this patent is extended or adjusted under 35 U.S.C. 154(b) by 22 days.

(21) Appl. No.: 17/438,319

(22) PCT Filed: Mar. 16, 2020

(86) PCT No.: PCT/EP2020/057156
§ 371 (c)(1),
(2) Date: Sep. 10, 2021

(87) PCT Pub. No.: WO2020/187858
PCT Pub. Date: Sep. 24, 2020

(65) Prior Publication Data
US 2022/0185165 A1 Jun. 16, 2022

(30) Foreign Application Priority Data
Mar. 15, 2019 (GB) .................................. 1903557

(51) Int. Cl.
*B60P 1/44* (2006.01)

(52) U.S. Cl.
CPC ........... *B60P 1/4457* (2013.01); *B60P 1/4421* (2013.01)

(58) Field of Classification Search
CPC ......... B60P 1/44; B60P 1/4407; B60P 1/4414; B60P 1/4421; B60P 1/4428; B60P 1/4435; B60P 1/4442; B60P 1/445; B60P 1/4457; B60P 1/4464; B60P 1/4471; B60P 1/4478; B60P 1/4485; B60P 1/4492; E06B 9/02; E06B 9/11; E06B 9/13; E06B 9/24; E06B 9/40; E06B 9/52; E06B 9/54; E06B 2009/002; A61G 3/062

See application file for complete search history.

(56) References Cited

U.S. PATENT DOCUMENTS

| | | | |
|---|---|---|---|
| 8,714,669 B1 * | 5/2014 | Clausen ............... | A47B 49/004 312/297 |
| 2009/0072570 A1 * | 3/2009 | Savoy .................. | B60P 1/4421 49/360 |

FOREIGN PATENT DOCUMENTS

| | | | |
|---|---|---|---|
| BE | 1009289 A6 | 1/1997 | |
| DE | 2219232 A1 | 10/1973 | |
| DE | 102010014924 A1 | 10/2011 | |
| EP | 2135778 B1 | 12/2011 | |
| FR | 2602191 A1 * | 2/1988 | ............ B60P 1/4457 |

(Continued)

*Primary Examiner* — James Keenan
(74) *Attorney, Agent, or Firm* — HULTQUIST, PLLC; Steven J. Hultquist (57) ABSTRACT

A load platform configured for use as part of a tail lift on a vehicle is described, which includes a protector device in the form of a flexible sheet that is configurable, when the load platform is attached to a vehicle, to cover a gap between the tail lift and the vehicle. The protector device at a first end is anchored to the load platform by an elasticated fixing arrangement and at a second end is configured for attachment to a supporting structure of the tail lift or to a part of the vehicle to which the tail lift is attached. The protector device is oriented to cover a gap between the rear of the tail lift and the vehicle in a first position, and to occupy a plane substantially parallel to a main plane of the load platform in a second position.

10 Claims, 8 Drawing Sheets

(56) References Cited

FOREIGN PATENT DOCUMENTS

FR 2818895 A1 7/2002
GB 1134180 A 11/1968

* cited by examiner fig.1 fig. 2 fig.3 fig.4 fig. 5 fig. 6 fig. 7 fig. 8

VEHICLE TAIL LIFT PROTECTION APPARATUS

CROSS-REFERENCE TO RELATED APPLICATIONS

This is a U.S. national phase under 35 USC § 371 of International Patent Application No. PCT/EP20/057156 filed Mar. 16, 2020, which in turn claims priority under 35 USC § 119 of United Kingdom Patent Application No. 1903557.5 filed Mar. 15, 2019. The disclosures of all such applications are hereby incorporated herein by reference in their respective entireties, for all purposes.

FIELD OF THE INVENTION

The present invention relates to vehicle tail lift protection apparatus, in particular apparatus for protection from a vehicle's tail lift. More particularly the present invention relates to improving the safety of people operating or otherwise using a vehicle as comprises a tail lift, the invention thus relating to an improved load platform for use on a tail lift; a unit for attaching to a tail lift load platform in order to improve the safety thereof and a vehicle comprising a tail lift that comprises an improved load platform however configured.

BACKGROUND

Increasing amounts of freight are moved in all societies.
Often freight is moved by land, for example in large goods vehicles (LGVs).
These LGVs may be unloaded and loaded typically from a rearmost tailgate or door, which door is arranged to lift as a shutter or swing open on side hinges.
In order to access the bed of the LGV, which is by definition above the wheels, and accordingly in order to access, unload or load items onto the bed it is usual for the LGV to have an automated lift, which lifts a platform or tail lift upwards from ground level to bed level, and which platform extends in use axially behind the LGV.
However this lift can be dangerous to users and goods, whereby items can become trapped between the platform and the vehicle, and/or may fall behind the platform, and into this gap.

PRIOR ART

EP 2 135 778 (GONIN) discloses a bumper which has guide rails allowing displacement of the bumper between a closing position and an opening position in which the bumper is entirely located at/below a loading threshold of an inner volume of a commercial motor vehicle for accessing the volume, by translation/quasi-translation along a vertical direction. An upper edge of the bumper is vertically projected above the threshold and cooperated with right and left doors for closing an inner volume access opening, in the closing position. A cage type structure is made of rigid plastic material. An independent claim is also included for a commercial motor vehicle comprising a rear volume and a bumper.

FR 2 818 895 (BOURGEOIS) discloses a platform which forms part of an assembly that retracts into a horizontal cavity beneath the floor of a public service vehicle when not in use and comprises a sliding frame and powered levers to raise and lower the platform. The assembly also incorporates a shutter that pivots about a horizontal axis on the platform between a vertical position when the platform is at its lowest point and a horizontal one when the platform is in line with the vehicle floor, covering the gap between the edge of the platform and the floor. The shutter is connected to the sliding frame by a spring.

GB 1 134 180 (ADAMSON) discloses a safety device for lifts including a bar suspended horizontally beneath the tail of a vehicle so that it lies close to the edge of the lift platform as the lift is raised and lowered and will therefore be engaged by any obstruction projecting beyond the edge of the lift platform when the lift is being raised to therefore lift the bar upwardly, the bar in its normal position maintaining a switch in the electric circuit of the lift closed, but on being lifted by the obstruction, opening the switch to break the lift circuit and immediately bring the lift to rest.

Belgian patent application publication no 1009289A6, entitled Vehicle with loading lift and safety opening', as published in Jan. 7, 1997, discloses a vehicle with a loading lift as comprises a flap to cover a gap between a load platform and vehicle loading floor during loading and which may be raised to a vertical position extending above a level of the load platform to act as a fence, but the flap relates to protection from an animal or person's foot entering the gap when the load platform is at the same level as the loading floor rather than during movement of the load platform into position.

German patent application, publication no. DE102010014924A1 in the name of Christian Kuhnel, as published Oct. 20, 2011 is entitled 'Anti-falling guard for load shell walls for refitting of warehouse or trucks at load shell walls, has tear proof material accommodated in a shutter cabinet'. However the shutter cabinet is such that space is required for it and the specific disclosure relates to a type of underslung lift that is stored underneath the rear of the vehicle. With many types of lifts, such as, for example, so-called column lifts, the lift apparatus is such that space to position such a shutter cabinet is not available.

The present invention arose in order to overcome problems suffered by existing devices.

SUMMARY OF THE INVENTION

According to a first aspect of the present invention there is provided a load platform (1) configured for use as part of a tail lift on a vehicle, said load platform comprising a protector device (3) in the form of a flexible sheet (38) that is configurable, when said load platform is attached to a vehicle, to cover a gap between the tail lift and the vehicle, said tail lift characterised in that:

said protector device (3) is, at a first end, anchored to said load platform by an elasticated fixing arrangement and at a second end that is opposite said first end, configured for attachment to a supporting structure of the tail lift (10) or to a part of a given vehicle to which the tail lift is attached;

wherein, upon said load platform being attached to a vehicle:

when said load platform (1) is in a first position, substantially at ground level, said protector device (3) is oriented such that it occupies a plane that is substantially vertical and covering the gap as exists between the rear of the tail lift and the vehicle;

when said load platform (1) is in a second position, substantially raised from ground level and at the level of the vehicle load deck, said protector device (3) is oriented such that it occupies a plane that is substantially parallel to a main plane of the load platform; and during movement of said load platform (1) from said first position to said second raised position, said elasticated fixing arrangement contracts in order to thereby draw said device 3 into said main plane of said load platform; and during movement of said load platform (1) from said second position to said first position, said elasticated fixing arrangement expands in order to thereby enable said device 3 as is attached to said supporting structure, to be drawn from said load platform (1) in order to cover said gap.

Preferably, said load platform is configured for use as a load platform of a column lift.

Preferably, said elasticated fixing arrangement utilises at least one spring.

Preferably, said protector device (3) is configured at said second end for rigid attachment to a supporting structure.

Preferably, said platform comprises a substantially hollow structure that substantially encases said protector device 3 when said elasticated fixing arrangement is contracted.

Preferably, said protector device (3) comprises a high visibility reflective strip.

Preferably, a portion of said protector device is perforated to enable the tail lights of a given vehicle to which the platform is attached to be seen when the load platform is at ground level.

According to a second aspect of the present invention, there is provided a tail lift for a vehicle comprising a load platform (1) as configured in accordance with the present invention.

According to a third aspect of the present invention, there is provided a vehicle comprising a tail lift as configured in accordance with the present invention.

According to a fourth aspect of the present invention, there is provided a vehicle safety unit configured for use with a load platform of a tail lift of a vehicle, said unit comprising a protector device in the form of a flexible sheet that is configurable to cover a gap between the tail lift and the vehicle, said safety unit characterised in that:

said protector device is, at a first end, anchored to said load platform by an elasticated fixing arrangement and at a second end that is opposite said first end, configured for attachment to a supporting structure of the tail lift or to a part of a given vehicle to which the tail lift is attached;

wherein, upon said safety unit being attached to a vehicle:

when said load platform is in a first position, substantially at ground level, said protector device is oriented such that it occupies a plane that is substantially vertical and covering the gap as exists between the rear of the tail lift and the vehicle;

when said load platform is in a second position, substantially raised from ground level and at the level of the vehicle load deck, said protector device is oriented such that it occupies a plane that is substantially parallel to a main plane of the load platform; and during movement of said load platform from said first position to said second raised position, said elasticated fixing arrangement contracts in order to thereby draw said device 3 into said main plane of said load platform; and during movement of said load platform from said second position to said first position, said elasticated fixing arrangement expands in order to thereby enable said device 3 as is attached to said supporting structure, to be drawn from said load platform (1) in order to cover said gap.

According to a further aspect of the present invention there is provided a vehicle tail lift protection apparatus, comprising a tail lift comprising a platform and a vehicle attachment means, a vehicle, and a protector device, wherein the protector device is arranged to extend between the vehicle attachment means and the vehicle.

Preferably, the device comprises a frame and a flexible material.

Preferably, one end of the device is connected at an anchor within the platform.

Preferably, the other end of the device is connected to the vehicle or vehicle attachment means.

Preferably, the platform moves from a lower position to a higher position the device is stored at least in part within the platform.

Preferably, the device is arranged to spring-bias retract.

The vehicle attachment means is envisaged to be located at the top of the tail lift.

For example the vehicle attachment means may comprise a support, which support may comprise a vertical lift support. For example the vertical lift support may comprise a pair of vertically arranged runners.

The apparatus may comprise a tail lift lifting mechanism, which mechanism is arranged to move the tail lift in a vertical direction with reference to the vehicle.

Such lifting mechanism may comprise a hydraulic lifting mechanism. Such lifting mechanism may comprise a pneumatic lifting mechanism. Such lifting mechanism may comprise one or more linear actuators.

The tail lift may comprise a substantially horizontal platform comprising an upper face and a lower face, which may be envisaged to be largely parallel.

The upper face may be arranged to be lifted by the mechanism on the support from a first position below the vehicle's loading bed, for example a position close to the ground, into a second position coplanar with the vehicle's loading bed.

When in the first position the apparatus provides a gap between the support members, below the vehicle, or vehicle loading bed, and behind the platform.

In this way the device of the present invention is arranged to predominantly or substantially fill this gap.

The device of the present invention may therefore comprise a blocking means. The blocking means may be arranged in use therefore to block or fill this gap, such that items may not enter the gap between the platform and the vehicle, and consequently risks of damage to such items is vastly reduced.

In this way it may be envisaged that the blocking means may be arranged to move with the support and/or lifting mechanism, and platform.

For example the blocking means may be arranged to move from a first extended position to a second retracted or contracted or collapsed position.

The blocking means may be envisaged to be substantially planar in the first position and may be envisaged to be substantially collapsed or minimised in the second position.

The blocking means may comprise a planar sheet. Such sheet may comprise a rollable sheet or flexible material.

For example in the second position the sheet may be rolled about a spindle or may be loosely folded or collapsed. Still further in the second position the sheet may be extended into the first position, for example comprising elastomeric material.

In some embodiments the device may comprise a spring bias, so as to bias the device to retract.

In this way the device may comprise an inelastic material. In this way in turn the material may be arranged to provide retroreflective material, and/or may be envisaged to be safer and better able to withstand damage.

The blocking means may comprise a net or mesh. Such net or mesh may be envisaged to occupy a small space when in the second position.

The blocking means may be envisaged to comprise a folding or concertina portion, which may be envisaged to fold down into a reduced footprint.

In some embodiments the blocking means may be arranged to be released or engaged so as to allow for use of the apparatus without the device forming a block between the vehicle and tail lift.

A preferred embodiment of the invention will now be described by way of example only and with reference to the Figures in which.

BRIEF DESCRIPTION OF FIGURES

DETAILED DESCRIPTION OF FIGURES

With reference to the figures there is shown an embodiment of the device generally comprising vehicle tail lift protection apparatus, comprising a tail lift 99 comprising a platform 1 and a vehicle attachment means 40 comprising runners 2, a vehicle (not shown), and a protector device 3, wherein the protector device 3 is arranged to extend between the vehicle attachment means and the vehicle in use.

Figure 1:
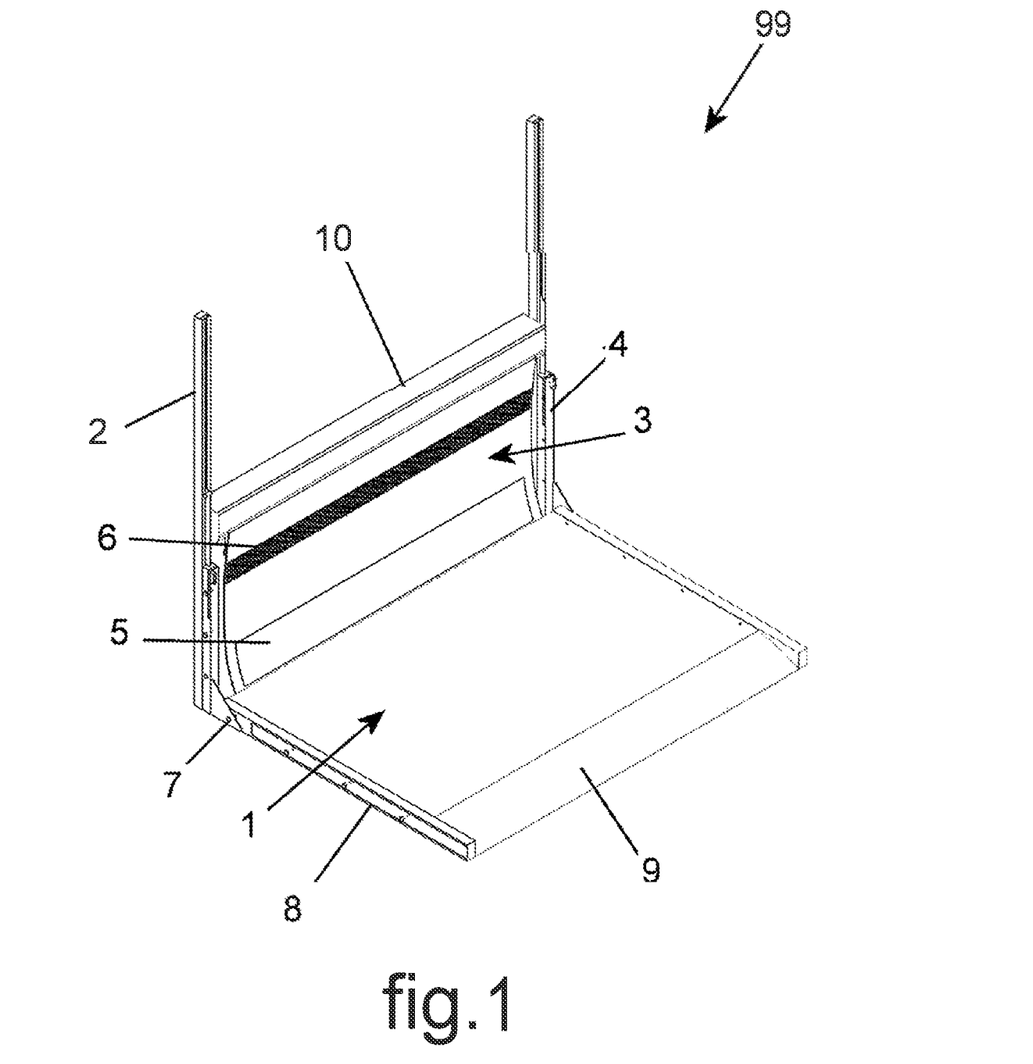
FIG. 1 shows an isometric view of an embodiment of the tail lift comprising a load platform and an associated protector device according to the present invention in a first position.
Figure 2:
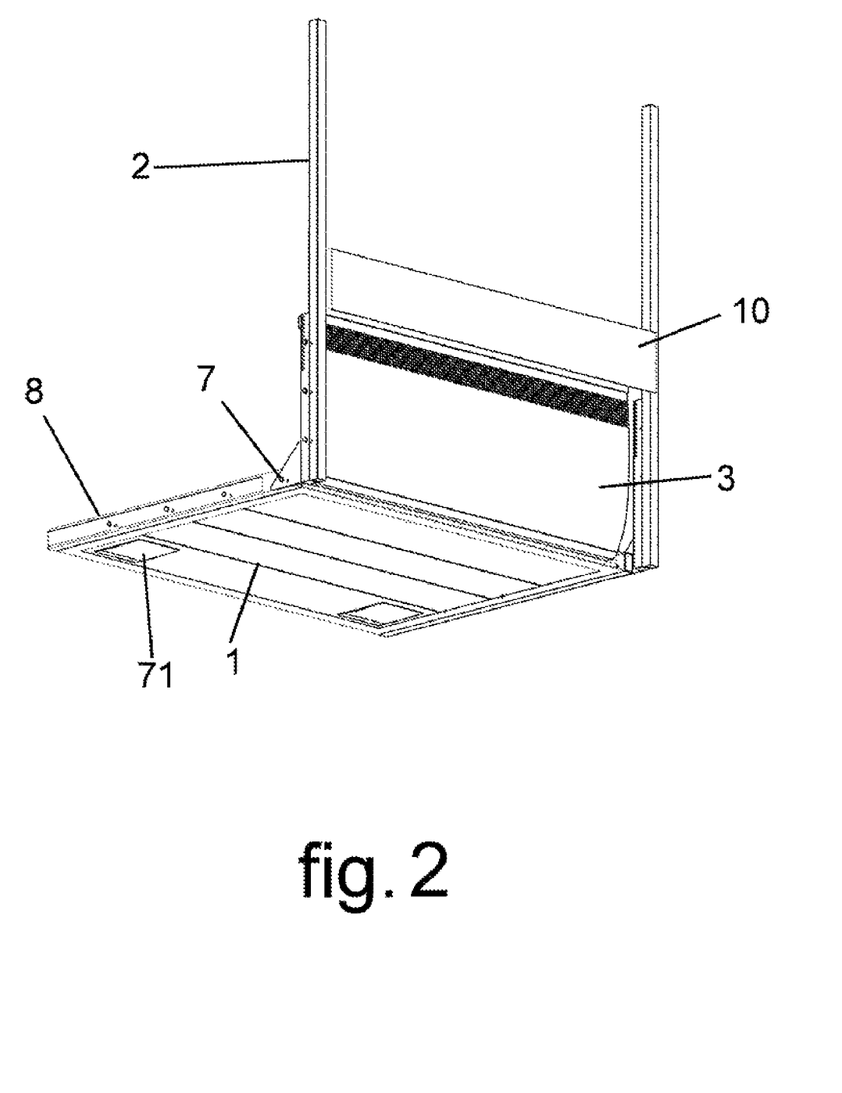
FIG. 2 shows a reverse isometric view of the embodiment as shown in FIG. 1.
Figure 3:
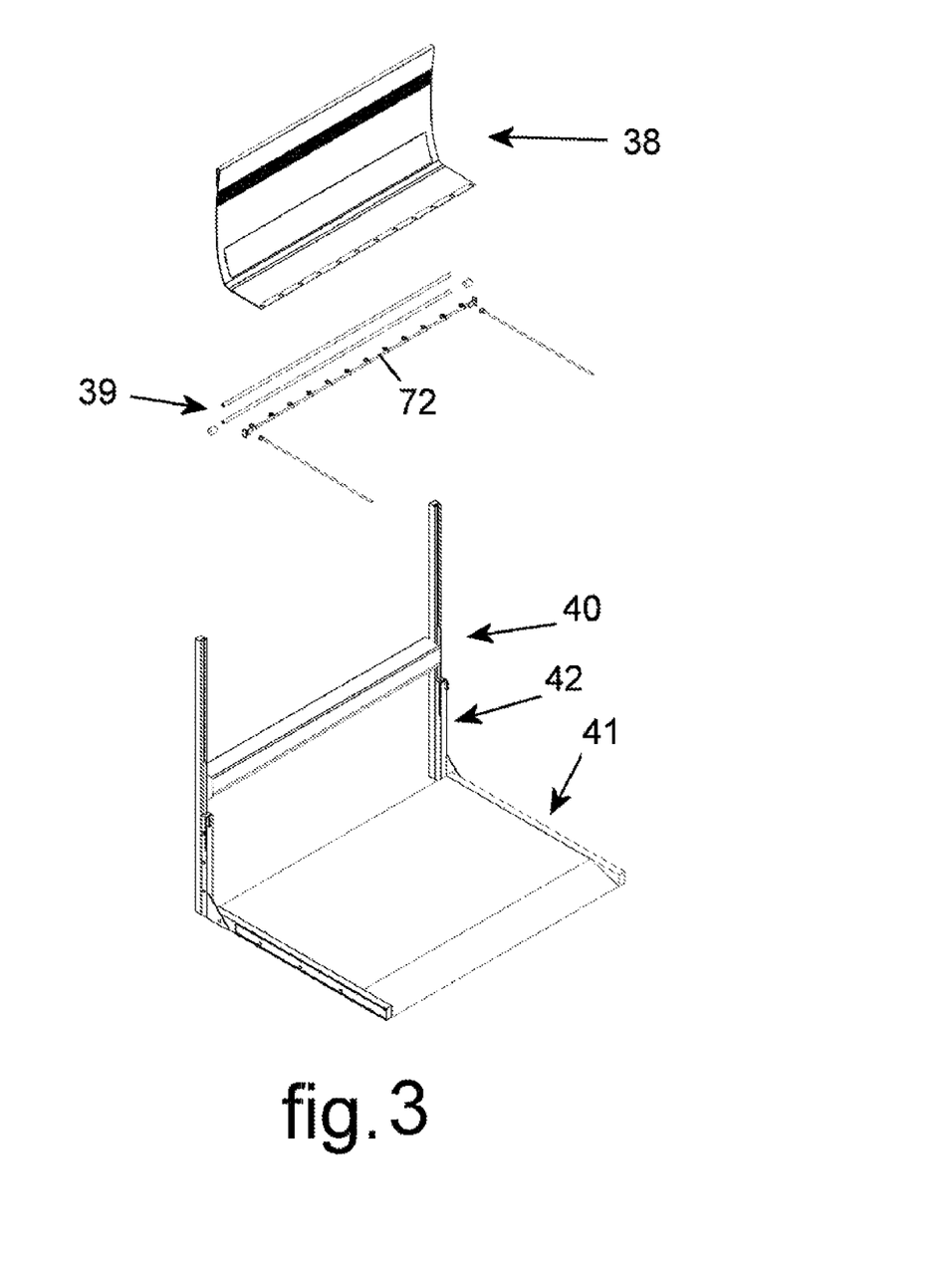
FIG. 3 shows an isometric exploded view of the embodiment shown in FIG. 1.
Figure 4:
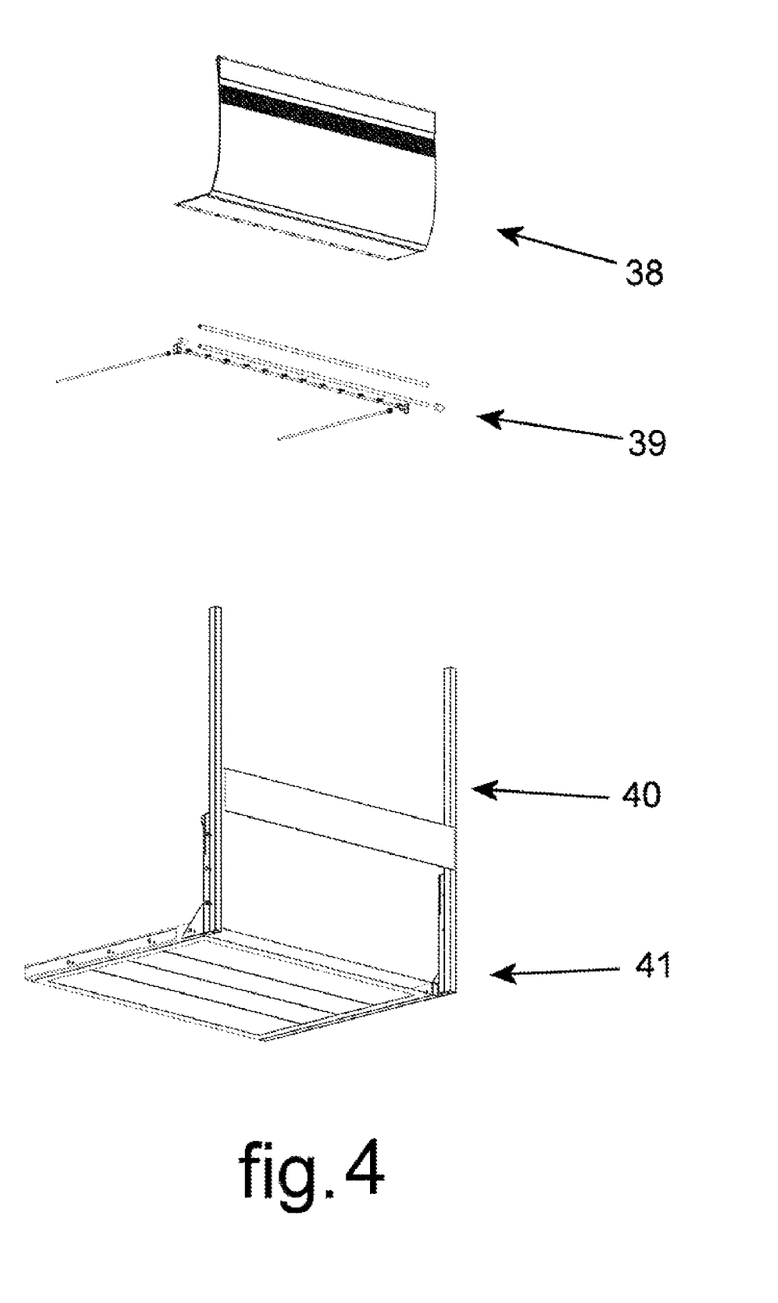
FIG. 4 shows a reverse isometric exploded view of the embodiment shown in FIG. 1.
Figure 5:
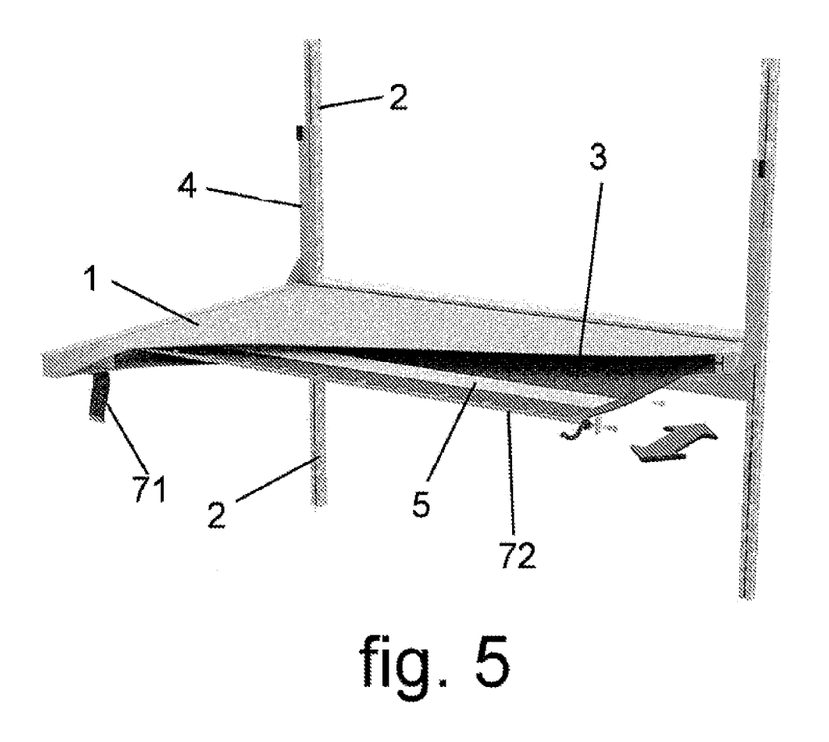
FIG. 5 shows a sketch isometric detail section view of the embodiment of a tail lift shown in FIG. 1 and such that the load platform is in a second (raised) position.
Figure 6:
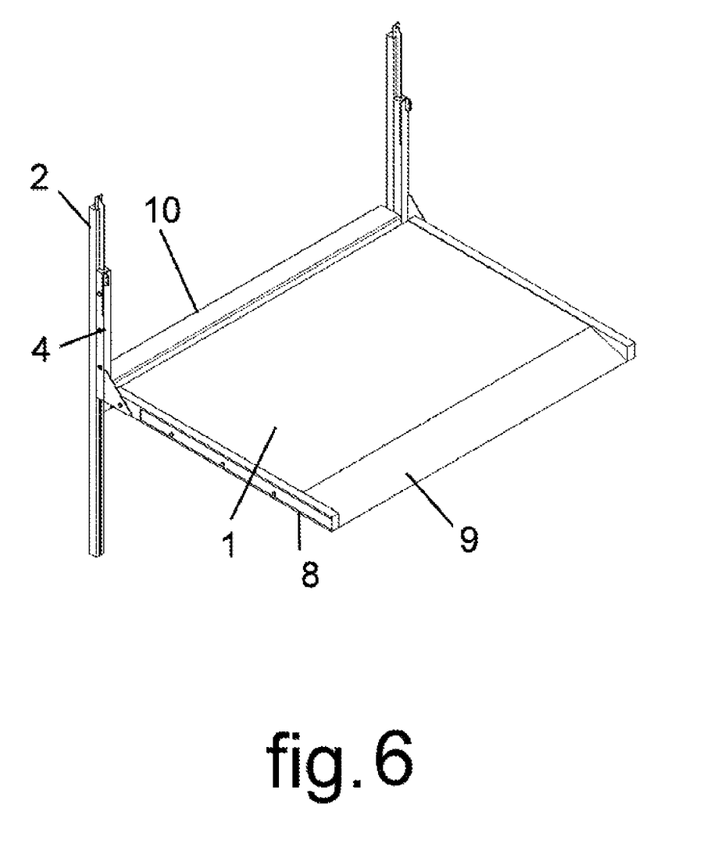
FIG. 6 shows another isometric view of the embodiment shown in FIG. 1 in the second position.
Figure 7:
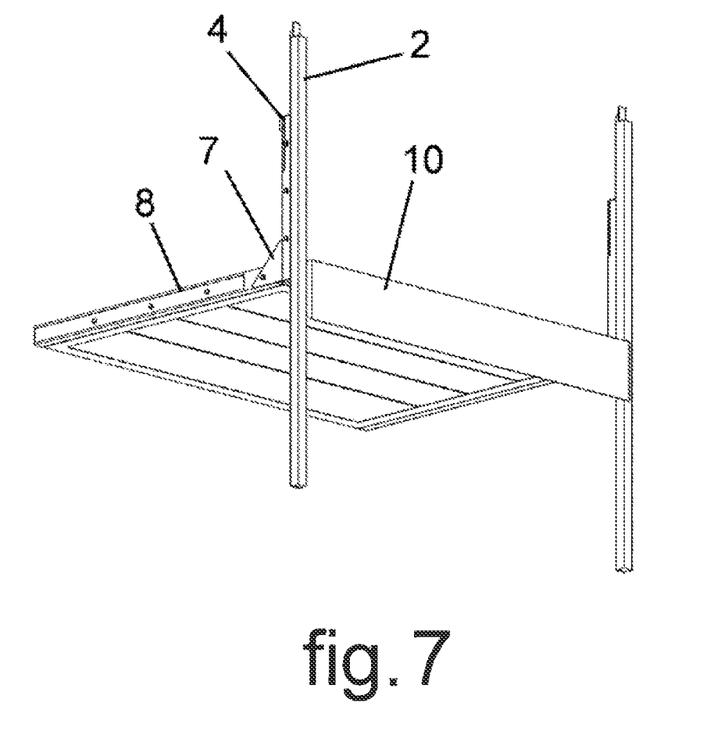
FIG. 7 shows a reverse isometric view of the embodiment as shown in FIGS. 5.
Figure 8:
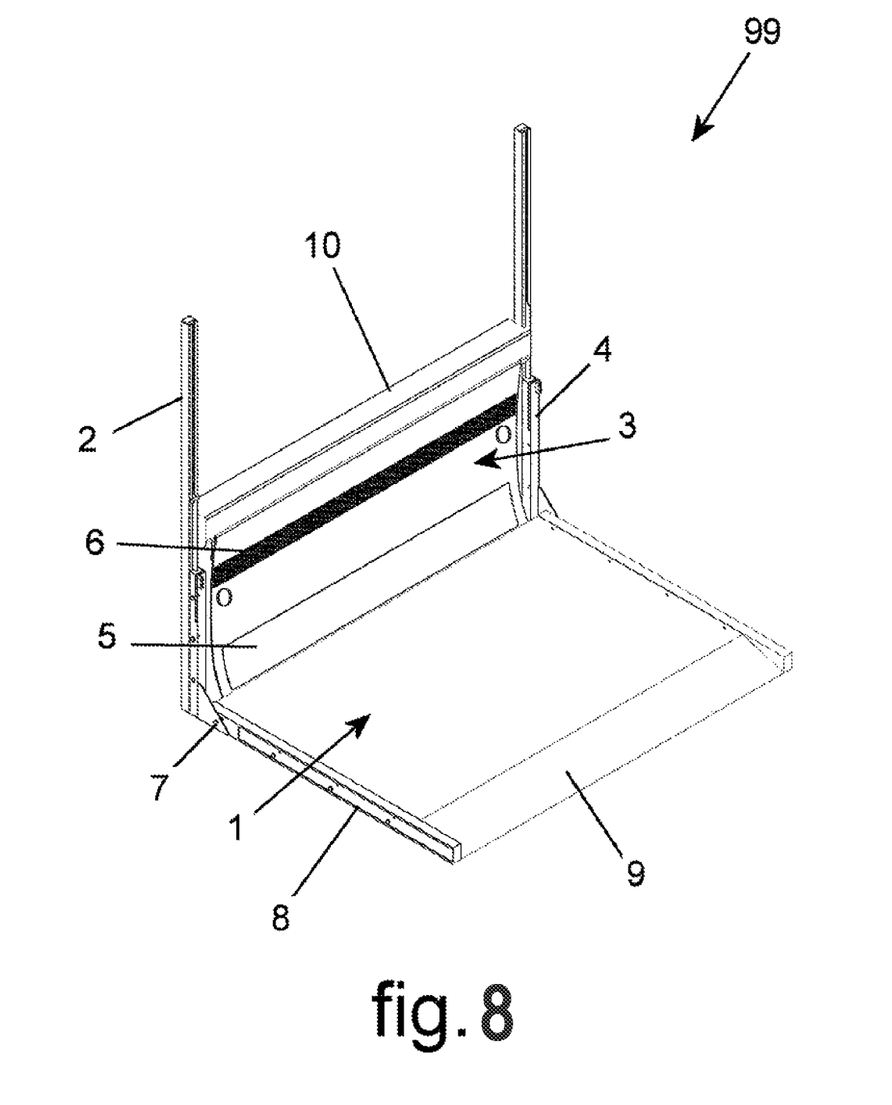
FIG. 8 shows an isometric view of an embodiment of the tail lift comprising a load platform and an associated protector device according to the present invention, FIG. 8 being identical to FIG. 1 except that the protector device 3 in FIG. 8 is perforated at the position of vehicle lights so that the vehicle lights can be seen when the protector device (sheet) 3 is in its fully deployed gap protection position as shown.

In particular reference to the figures only the tail lift and device are shown, wherein the platform of the tail lift is shown in a first position in FIG. 1 and in FIGS. 2-4 and in a second position in FIGS. 5-7.

The platform moves vertically on the runners 2 according to standard means of movement, for example an electrically powered lift system through the vehicle's electrical system.

A horizontal bar 10 joins the runners 2, and the top edge of the device 3 is attached to the bar 10.

The bottom edge of the device 3 is attached to the platform 1, within the platform.

The platform is arranged as part of a unit 41 to move on vertical struts 4 on the runners 2, which struts are connected to the platform 1 through side bracing pivots 7 and horizontal platform sides 8.

The platform 1 comprises a bevelled front edge 9. The platform also comprises a pair of reflective flaps 71 below its lower surface.

The device comprises a flexible sheet material 38, such as a polymer or polyethylene.

The platform has an internal space within which the device is anchored at a lateral anchor 72 comprising a part of the device frame 39. The anchor 72 comprises multiple spaced apart pins through which the device is pinned.

The device frame 39 further comprises two runner bars arranged at the sides of the platform internal space, and along which the anchor runs.

The device comprises a reflective strip portion 6 arranged to be proximate the lateral bar 10 in use, and a reinforced lateral section 5 arranged to be proximate the platform in use.

The pictured embodiment of the device is arranged to spring bias retract on the frame, that comprises the anchor 72 runners within the internal space of the platform. The device may comprise extension springs.

In this way as the platform moves into the lowered position the material of the device pulls the anchor 72 along the frame and the material remains taut at all times.

Accordingly the gap between the vehicle (not shown) and the platform 1 always remains blocked safely, wherein there is no need for any power source for movement of the device.

In some embodiments the device may comprise a cam lock which is disengaged by movement of the platform.

The invention has been described by way of examples only and it will be appreciated that variation may be made to the above-mentioned embodiments without departing from the scope of invention as defined by the claims, in particular but not solely combination of features of described embodiments.

Furthermore, it is to be noted that the invention disclosed herein is primarily concerned with tail lifts which by definition are used at the rear of a vehicle. Nevertheless those skilled in the art will appreciate that such 'tail lifts' may be used elsewhere on a vehicle and most notably along the sides of a lorry or other LGV, van or truck, with the present invention thus encompassing such uses and thus the lift or load platform thereof still being referred to as a tail lift herein.

In addition, the present invention is primarily, but not necessarily exclusively directed to a tail lift that is of the column lift type as opposed to an underslung type tail lift. By 'column lift', those skilled in the art will appreciate that such a lift comprises a pair of spaced apart columns or runners (for example, see herein FIG. 1 or 2) such that the load platform moveably attached there to is configured to move up and down, typically by way of appropriately configured grooves extending along the lengths of the columns. Typically the runners are each disposed such that their longitudinal axis is disposed vertically (or substantially vertically) to enable the load platform to move up and down in a vertical or substantially vertical direction. With a column type tail lift as are very popular in the UK and elsewhere there is typically not the space available for providing a shutter in a cabinet of the type disclosed in the aforementioned reference DE102010014924A1, as published Oct. 20, 2011 is entitled 'Anti-falling guard for load shell walls for refitting of warehouse or trucks at load shell walls, has tear proof material accommodated in a shutter cabinet'.

In order to further explain the nature of the present invention reference is made again to FIGS. 1-4 of the load platform in a first position as compared to FIGS. 5-7 that show the load platform in a second (raised) position. FIG. 1 shows a tail lift 99 as configured in accordance with the present invention wherein the platform 1 is disposed at the bottom end of the respective runners (2). In typical use on a vehicle this level of the platform is such that it is effectively at ground level or near ground level, thereby enabling goods to be placed on the platform such as by way of rolling onto the platform across the front edge 9 of the platform. In this position of the platform 1, the protector device 3 is shown to be covering the gap between runners between the respective pair of runners 2.

As described above the protector device 3 comprises a sheet of flexible material and in the preferred embodiment it is, at its top edge, attached to the horizontal bar 10. Thus, attachment of protector device 3 to the back of the tail lift, such as conveniently to horizontal bar 10, is preferred, but it may be attached to any appropriate part of the rear of the tail lift 99, the rear part of the tail lift 99 effectively itself constituting, or a part thereof comprising, means for attaching the tail lift to a vehicle (i.e. a vehicle attachment means). However, those skilled in the art will appreciate that device 3 may, in operation on a vehicle, otherwise be attached to a similarly located part of the vehicle (such as the chassis or other appropriate structure) to which a lift configured in accordance with the invention is attached. The opposite end of the protector device 3 is thus the bottom end which, as described above, is attached to the platform 1. In a preferred embodiment, the platform 1 is hollow, such that the device 3 is attached to the inside of platform 1. The means for attaching the bottom end of device 3 to the inside of platform 1 is such that it enables the device 3 to be automatically drawn out of platform 1 as the lift platform is lowered downwards towards the ground and automatically returned to a stored position within platform 1 as the lift platform is returned to its higher position wherein the platform 1 is at its raised position vis-à-vis at the level of the load deck of a given vehicle to which the tail lift 99 is attached. In a preferred embodiment, the device 3 is stored within platform 1 as constitutes a walled housing or within the confines of the load platform as comprises an upper face for loading without a corresponding spaced apart lower face and with the protector device 3 thus fitted on the underside of the platform within its perimeter edges.

In order to provide the aforementioned functionality as regards the deployment and storage of device 3, the attachment of the top end of device 3 to the horizontal bar 10 (or a similarly located place) may comprise any suitable standard/conventional appropriate fixing means for fixing a sheet of flexible material to a supporting structure such as a vehicle body or to a part of the rear of the tail lift 99. Thus, for example, metal ringed holes towards the top end of protector device 3 may be provided such that nutted bolts passing through such holes may be used to attach device 3 to the supporting structure (such as horizontal bar 10). In contrast, to provide the respective deploy and store functionality of device 3 out of and into load platform 1, the bottom end of device 3 is attached to platform 1 in a non-rigid manner. By 'non-rigid manner' it is meant here that the attachment means as anchors the bottom edge of device 3 to the platform 1 is expandable and contractible such that it remembers its contracted state. In other words the attachment means that is used is elastic. As those skilled in the art will understand a spring is an example of an elastic object—when stretched, it exerts a restoring force which tends to bring it back to its original length. Suitable means to achieve such functionality are, as described earlier, extension springs and a series of such springs attaching the bottom edge of device 3 to the inside of the platform 1 is highly preferred. Nevertheless other elastic fixing means are known and may be used. Thus, for example, bungee type cords (an example of which is depicted at the right hand corner of device 3 shown in FIG. 5) made of an elasticated material such as rubber or the like may be used, but extension springs are preferred, preferably of steel, due to strength and the fact that they do not deteriorate/degrade to the same extend as does rubber.

The preferred embodiment of a tail lift protection apparatus and also of a tail lift comprising said apparatus as comprises a flexible sheet attached directly at the upper end to a vehicle attachment means (or to a vehicle body) and at the other end attached, via an elastic attachment arrangement, to the load platform, therefore provides a tail lift protection apparatus that is configured, during use, to automatically cover the gap that exists between a deployed platform of a/the tail lift (notably a column type tail lift) and a vehicle load deck that is located at a level above the deployed load platform. The fact that the protector device 3 makes use of the property of elasticity in its attachment to the load platform provides many benefits over prior art tail lift protection devices and arrangements such as avoiding the need for electronic sensors, minimising mechanical complexity/avoiding the need for a roller type shutter and the consequent space problems for storing such a rolled up shutter and being able to keep the overall thickness of the load platform relatively low (a thicker platform means a greater step height to move goods on/off to from). The fact that the protector device 3 is, as per the preferred embodiment, stored within or substantially within the platform is, as will be appreciated by those skilled in the art, highly advantageous over prior art devices and systems. Storing the protector device in a plane that is parallel to or substantially parallel to the main plane of the load platform is optimal in terms of strong the device 3 in a manner that avoids having to use a roller type shutter mechanism of the type disclosed in German patent application, publication no. DE102010014924A1 and for which there is frequently not sufficient space available. By 'main plane' it is meant the plane that is occupied by the upper surface of the load platform 1 as is depicted in various of FIGS. 1-7, such as in particular, FIGS. 1, 3, 5 and 6.

Thus, referring to FIG. 5 the platform 1 is shown in cut-away view to enable the device 3 to be seen below the upper face of the platform. The view of FIG. 5 (and associated FIGS. 6-7) shows the load platform 1 at a level such that it has been raised vertically upwards to a higher level as compared with the position shown in FIGS. 1-4, the latter effectively being such that the load platform is fully lowered (thus nominally at ground level) whereas the former being such that load platform 1 is at a level of the load deck (not shown) of a vehicle (not shown). In addition the cut-away view of FIG. 5 shows that the load platform 1 has an upper face and a lower face with the protector device 3 stored therebetween. In the preferred embodiment the device 3 is thus stored within the platform. Nevertheless, in accordance with the present invention, by the term 'within' it is meant either (a) a hollow platform that comprises an upper face and a lower face that is spaced apart from the upper face such that the protector device 3 is effectively entirely or at least substantially encased therebetween or (b) a platform that comprises a front face without a spaced apart rear face, such that the device 3 is stored on the underside of the upper face within the confines of the perimeter edges of the platform. Those skilled in the art will thus understand that both of the respective approaches, (a) and (b), are to be considered as comprised within the scope of the presently claimed invention.

The elasticated attachment of protector device 3 to the load platform 1 is to be contrasted with the nature of the attachment means at the other end that is configured to attach to the rear of the tail lift frame or to a rear part of a vehicle that the tail lift is attached to. This latter attachment to the rear of the tail lift is not required to be elastic and is preferably non-elastic in order to thus facilitate protector device 3 to be effectively drawn out of its stored position.

During the process of raising the load platform 1 from the lower (ground) level position of FIGS. 1-4 to the higher level (vehicle load deck) as per FIGS. 5-7, the protector device responds by retracting into its stored position adjacent to the load platform.

On the other hand, during the process of lowering the load platform 1 from the higher (deck) level of FIGS. 5-7 to a lower level (ground level) as per FIGS. 1-4, the protector device is drawn out from its stored position so as to cover the gap that increases in size at the rear of the lift adjacent to the vehicle as the load platform is lowered, the gap thus being largest on full deployment of the load platform to ground level. As will be seen from the Figures the device 3, comprising a flexible sheet, is such that when the load platform 1 moves from the position at the vehicle load deck to ground level or vice versa the flexible sheet of protector device 3 is such that it has effectively changed orientation by ninety (90) degrees. At the height of the vehicle load deck the protector device 3 is stored within the load platform such that it is parallel to or substantially parallel to the main plane occupied by the upper surface of the load platform whereas when it is drawn out to cover the resulting gap between the rear of the tail lift and the vehicle it is substantially disposed at 90 degrees to the main plane of the platform 1, in order to thereby cover the gap between the tail lift and the vehicle to which the tail lift is attached to.

This change in orientation of the protector device 3 arises substantially in proportion to the amount that the load platform is moved in a given direction. The change in orientation is facilitated through the device substantially comprising a flexible sheet like member, such as comprises a sheet of flexible material. Thus, when the load platform is midway between the load deck of the vehicle and ground level then approximately half of the flexible sheet is outside the rear perimeter edge of the load platform and thus covering the gap between the tail lift and vehicle and half is within the perimeter edge of the load platform. The amount of the flexible sheet that is outside of the rear perimeter edge of the load platform increases as the load platform is lowered until the load platform reaches ground level whence the flexible sheet is substantially all outside and covering the gap as it at its largest. As the load platform is raised again the amount of the flexible sheet that is outside of the rear perimeter edge of the load platform decreases as the load platform is raised until the load platform reaches the level of the vehicle load deck whence there is no gap or only a minor gap and the flexible sheet is substantially entirely within the rear perimeter edge of the load platform.

The present invention may be deployed in various forms and notably retrofitted to a given vehicle as comprises an existing tail lift or being configured as part of an overall tail lift system that is to being newly installed to a given vehicle.

Thus, in a first preferred embodiment of the present invention, an existing load platform may be taken off a vehicle and replaced with a load platform that is configured in accordance with the present invention and which thus comprises a flexible sheet stored adjacent to or substantially adjacent to load platform 1 and in a plane that is parallel to or substantially parallel to a main plane of the load platform.

In a further preferred embodiment of the present invention, an existing load platform of a given vehicle may remain in place and a safety unit comprising the invention be fitted thereto, such safety unit comprising an appropriately configured housing for storing the flexible sheet in a plane that is parallel to or substantially parallel to a main plane of the load platform.

In all embodiments of the invention described and/or contemplated above those skilled in the art will understand that the invention comprises a device 3 that is stored within the load platform. Moreover, those skilled in the art will understand that a main aspect of the present invention comprises the device 3 being, when in its stored position on a tail lift, planar or substantially planar and stored such that it is parallel to or substantially parallel to the main plane of the upper surface of an associated load platform.

A load platform 1 as configured in accordance with the present invention and thus comprising a protector device 3 or a unit comprising a protector device 3 and appropriate attachment means for attachment of the protector device to a supporting structure (such as a horizontal bar 10 to the rear of a tail lift or to a vehicle body) may be fitted to any vehicle that comprises a tail lift anywhere, such as for example a large goods vehicle (LGV), a heavy goods vehicle (HGV), truck, pick-up truck, van or train wherever the tail lift is positioned on the vehicle whether it be at the rear (tail) of the vehicle or elsewhere such as, notably along a side of the vehicle. The main use of the invention is on ground based vehicles, notably road vehicles, but potentially the invention may find application on other vehicles besides ground based vehicles.

The present invention provides many advantages over known methods of improving tail lift safety. Notably known tail gate lifts obscure rear lights of vehicles to which they are attached and hence a preferred embodiment of the present invention includes provision of high visibility reflective strip 6 which is clearly visible at night when the tail load platform is deployed at ground level. It is also preferred that a portion of the reflective strip or a portion of the same location on the sheet 3 when there is no reflective strip is perforated at the position of vehicle lights so that the vehicle lights can be seen when the protector device (sheet) 3 is in its fully deployed gap protection position as per any of FIGS. 1-4. Such perforation enables the tail lights of a given vehicle to which the platform is attached to be seen when the load platform is at ground level.

The invention claimed is:

1. A load platform configured for use as part of a tail lift on a vehicle, said load platform comprising a protector device in the form of a flexible sheet that is configurable, when said load platform is attached to a vehicle, to cover a gap between the tail lift and the vehicle, said tail lift characterised in that:
    said protector device is, at a first end, anchored to said load platform by an elasticated fixing arrangement and at a second end that is opposite said first end, configured for attachment to a supporting structure of the tail lift or to a part of a given vehicle to which the tail lift is attached;
    wherein, upon said load platform being attached to a vehicle:
    when said load platform is in a first position, substantially at ground level, said protector device is oriented such that it occupies a plane that is substantially vertical and covering the gap as exists between the rear of the tail lift and the vehicle;

when said load platform is in a second position, substantially raised from ground level and at the level of a vehicle load deck, said protector device is oriented such that it occupies a plane that is substantially parallel to a main plane of the load platform; and during movement of said load platform from said first position to said second raised position, said elasticated fixing arrangement contracts in order to thereby draw said device into said main plane of said load platform; and during movement of said load platform from said second position to said first position, said elasticated fixing arrangement expands in order to thereby enable said device as is attached to said supporting structure, to be drawn from said load platform in order to cover said gap.

2. A load platform as claimed in claim 1 wherein said load platform is configured for use as a load platform of a column lift.

3. A load platform as claimed in claim 1 wherein said elasticated fixing arrangement utilises at least one spring.

4. A load platform as claimed in claim 1 wherein said protector device is configured at said second end for rigid attachment to a supporting structure.

5. A load platform as claimed in claim 1 wherein said platform comprises a substantially hollow structure that substantially encases said protector device when said elasticated fixing arrangement is contracted.

6. A load platform as claimed in claim 1 wherein said protector device comprises a high visibility reflective strip.

7. A load platform as claimed in claim 1 wherein a portion of said protector device is perforated to enable the tail lights of a given vehicle to which the platform is attached to be seen when the load platform is at ground level.

8. A tail lift for a vehicle comprising a load platform as configured in accordance with claim 1.

9. A vehicle comprising a tail lift as configured in accordance with claim 8.

10. A safety unit configured for use with a load platform of a tail lift of a vehicle, said unit comprising a protector device in the form of a flexible sheet that is configurable to cover a gap between the tail lift and the vehicle, said safety unit characterised in that:

said protector device is, at a first end, anchored to said load platform by an elasticated fixing arrangement and at a second end that is opposite said first end, configured for attachment to a supporting structure of the tail lift or to a part of a given vehicle to which the tail lift is attached;

wherein, upon said safety unit being attached to a vehicle:

when said load platform is in a first position, substantially at ground level, said protector device is oriented such that it occupies a plane that is substantially vertical and covering the gap as exists between the rear of the tail lift and the vehicle;

when said load platform is in a second position, substantially raised from ground level and at the level of a vehicle load deck, said protector device is oriented such that it occupies a plane that is substantially parallel to a main plane of the load platform; and during movement of said load platform from said first position to said second raised position, said elasticated fixing arrangement contracts in order to thereby draw said device into said main plane of said load platform; and during movement of said load platform from said second position to said first position, said elasticated fixing arrangement expands in order to thereby enable said device as is attached to said supporting structure, to be drawn from said load platform in order to cover said gap.

* * * * *

UNITED STATES PATENT AND TRADEMARK OFFICE
CERTIFICATE OF CORRECTION

| | |
|---|---|
| PATENT NO. | : 11,794,622 B2 |
| APPLICATION NO. | : 17/438319 |
| DATED | : October 24, 2023 |
| INVENTOR(S) | : Andrew Timson |

It is certified that error appears in the above-identified patent and that said Letters Patent is hereby corrected as shown below:

In the Specification

Column 5, Line 34, "5 and; and" should be -- 5 and 6; and --.

Signed and Sealed this
Twenty-first Day of May, 2024

Katherine Kelly Vidal
*Director of the United States Patent and Trademark Office*